United States Patent [19]
Tsurufuji

[11] Patent Number: 5,832,653
[45] Date of Patent: Nov. 10, 1998

[54] INTER-LINE FISHING ROD

[75] Inventor: Tomoyoshi Tsurufuji, Saitama, Japan

[73] Assignee: Daiwa Seiko, Inc., Tokyo, Japan

[21] Appl. No.: 506,964

[22] Filed: Jul. 28, 1995

[30] Foreign Application Priority Data

Jul. 29, 1994 [JP] Japan ................................. 6-197264

[51] Int. Cl.$^6$ ........................... A01K 87/00; A01K 87/04
[52] U.S. Cl. ................................................. 43/24; 43/18.1
[58] Field of Search ............................. 43/18.1, 24

[56] References Cited

U.S. PATENT DOCUMENTS

| | | | |
|---|---|---|---|
| 343,802 | 6/1886 | Everett | 43/24 |
| 2,282,618 | 5/1942 | Stewart | 43/24 |
| 2,484,727 | 10/1949 | Patterson | 43/24 |
| 2,776,516 | 1/1957 | Jennette | 43/24 |
| 2,777,239 | 1/1957 | Cushman | 43/24 |
| 2,880,546 | 4/1959 | Pemberton | 43/24 |
| 3,432,958 | 3/1969 | Bellinger | 43/24 |
| 3,862,509 | 1/1975 | Petersen | 43/24 |
| 5,241,773 | 9/1993 | Burgh | 43/24 |
| 5,575,103 | 11/1996 | Hare . | |

FOREIGN PATENT DOCUMENTS

| | | | |
|---|---|---|---|
| 249360 | 8/1963 | Australia | 43/24 |
| 2080174 | 10/1971 | France | 43/24 |
| 3440148 | 10/1986 | Germany | 43/24 |
| 5-91324 | 12/1993 | Japan . | |

*Primary Examiner*—Kurt Rowan
*Attorney, Agent, or Firm*—Longacre & White

[57] ABSTRACT

The invention concerns an inter-line fishing rod excellent in line throwing performance with which the terminal hook device can be accurately thrown even far. An inter-line fishing rod comprises: a handle having a reel mounting seat on one side, and grips; a rod body connected to the front end portion of the handle, into which no fishing line is inserted; a rod pipe connected to the front end portion of the rod body in such a manner that the rod pipe is inclined with respect to the rod body towards the other side of the handle which is opposite to the one side thereof where the reel mounting seat is provided, the rod pipe having a fishing-line lead-in guide at the rear end through which a fishing line is inserted into the rod pipe.

23 Claims, 6 Drawing Sheets

INTER-LINE FISHING ROD

BACKGROUND OF THE INVENTION

This invention relates to an inter-line fishing rod which is improved in line throwing performance by reducing the resistance applied to the fishing line. The technical concept of the invention is applicable particularly to a lure fishing rod and a fly fishing rod with which a light terminal hook device is used.

An inter-line fishing rod in which a line lead-in section is provided at the rear end of its rod body, and the handle and the rod body are shifted from each other to prevent the rod body from being lowered in mechanical strength and to smoothly lead the fishing line out of the fishing reel mounted on the handle to the line lead-in section, is known in the art as disclosed by Japanese Utility Model Kokai Publication No. Hei. 5-91324.

In the inter-line fishing rod, the handle and the rod body are shifted from each other in such a manner that the rod body is slightly upwardly inclined with respect to the handle, or the former is in parallel with the latter. If, in the fishing rod, the handle and the rod body are greatly shifted from each other, then the rod body is greatly spaced from the axis of the handle. Hence, when the fishing rod is swung, for instance, to let the fishing line out of the fishing reel, the torque of the handle acts on the swinging operation, thus adversely affecting the operability of the fishing rod. In the case where the rod body and the handle are not so much shifted from each other, the fishing line is supplied from the fishing reel to the line lead-in section located below the fishing reel, so that the fishing line is passed through the rod body while being bent at the line lead-in section; that is, the resistance applied to the fishing line is not so much decreased as expected.

This problem is serious with a lure fishing rod with which a terminal hook device light in weight is used. That is, when the fishing rod is swung to let the fishing line out of the reel, the fishing line may be resisted contacting the inside of the fishing rod. In this case, even if the fisherman wants to throw the terminal hook device far, the terminal hook device may be dropped near him or thrown laterally of him; that is, it is not thrown to the aimed point.

SUMMARY OF THE INVENTION

In view of the foregoing, a primary object of the invention is to provide an inter-line fishing rod excellent in line throwing performance with which the terminal hook device can be accurately thrown far.

In order to achieve the foregoing and other objects, the invention provides an inter-line fishing rod which comprises:

a handle having a reel mounting seat on its one side, and grips;
  a rod body connected to the front end portion of the handle, into which no fishing line is inserted;
  a rod pipe provided in front of the rod body in such a manner that the rod pipe is inclined with respect to the rod body towards the other side of the handle which is opposite to the one side thereof where the reel mounting seat is provided,
    the rod pipe having a fishing-line lead-in guide at the rear end through which a fishing line is inserted into the rod pipe.

In the fishing rod thus constructed, the rod pipe through which the fishing line is passed is provided in front of the rod body which is connected to the front end portion of the handle, in such a manner that it is inclined towards one side of the handle which is opposite to the side where the reel mounting seat is provided. Hence, the fishing line is supplied from the fishing reel mounted on the reel mounting seat is obliquely extended, thus being inserted into the rod pipe through the fishing-line lead-in guide. In this case, the rod pipe is extended in the direction of supply of the fishing line, the fishing line is scarcely changed in the direction of extension; in other words, it is supplied substantially linearly. Therefore, the fishing line thus supplied is less resisted. This means that the fishing rod is excellent in line throwing characteristic.

In the fishing rod, the rod pipe is coupled to the rod body preferably in such a manner that the center of gravity of the rod pipe is on or near the prolongation of the central axis of the rod body. Since the rod pipe is coupled to the rod body in such a manner that the center of gravity of the rod pipe is on or near the prolongation of the central axis of the rod body. Hence, the line throwing operation is scarcely affected by the torque about the rod body. That is, the fishing rod is improved in line throwing characteristic.

In the fishing rod, an angle adjusting mechanism may be provided to vary an angle which the rod pipe forms with the rod body. Since the angle of inclination of the rod pipe can be adjusted, the rod pipe can be so set as to cope with the angle of extension of the fishing line which depends on the kind and size of the fishing reel mounted on the fishing rod. Accordingly, the fishing line can be linearly inserted into the rod pipe without being bent at the fishing-line lead-in guide.

In the fishing rod, it is preferable that the fishing-line lead-in guide is located in the middle of three equal parts into which the whole length of the fishing rod measured in the direction of the central axis of the rod body is divided. This arrangement is based on the fact that, when the length of the fishing rod is divided into three equal parts, in the part covering the rod body the fishing rod is not flexible being high in rigidity, whereas in the part covering the rod pipe it is flexible being low in rigidity. Hence, the fishing line, when supplied from the fishing reel, is laid outside until it reaches the fishing-line lead-in guide located in the middle of the three equal parts into which the length of the fishing rod is divided; that is, the resistance applied to the fishing line is reduced as much as possible. On the other hand, if the fishing line is unable to follow the flexible bending of the fishing rod in the line throwing operation, then it is impossible to throw the line far; that is, the fishing rod is not acceptable in line throwing performance. Hence, when extended over the fishing-line lead-in guide, the fishing line is inserted into the rod pipe so that it follows the flexible bending of the rod pipe. Thus, in this arrangement, the resistance applied to the fishing line is decreased greatly, while the fishing line is allowed to follow the flexible bending of the fishing rod.

In the fishing rod, the rod pipe and the rod body may be provided as one unit. The rod pipe and the rod body are provided as one unit, for instance, according to a method in which a material obtained by winding a fiber-reinforced resin prepreg tape is molded with an external mold. In the fishing-rod thus constructed, the rod body and the rod pipe are positively joined with each other, so that the resultant fishing rod is stable in line throwing performance.

In the fishing rod, the following is applicable: That is: The rod body is a hollow pipe which is substantially constant in diameter or is tapered towards the front end thereof, while the rod pipe is substantially tapered towards the front end thereof, and the inside diameter of the rear end portion of the rod pipe is larger than the inside diameter of the front end portion of the rod body, the rod body and the rod pipe provided as one unit except the junction of the rod body and the rod pipe being lower in flexural rigidity towards the front end of the fishing rod. The rod body is a hollow pipe, and therefore the fishing rod is light. The rear end portion of the rod pipe, which is gradually tapered towards its front end, is larger in inside diameter than the front end portion of the rod body which is substantially constant in diameter or gradually tapered towards its front end. This feature decreases the resistance which is applied to the fishing line when the latter passes through the rod pipe. Fundamentally, the fishing rod is smaller in flexural rigidity towards its front end. Therefore, the fact that the rod pipe is larger in inside diameter than the rod body does not adversely affect the condition of the fishing rod. That is, the fishing rod is improved in line throwing performance.

In the fishing rod, it is preferable that the rod body is made of a material which essentially contains fibers high in elasticity, and the rod pipe is made of a material which essentially contains fibers low in elasticity. The reinforced fibers different in elasticity are used to realize the gradient in flexural rigidity with ease.

The invention further provides an inter-line fishing rod which comprises:

a handle having a reel mounting seat, and grips;

a rod body connected to the front end portion of the handle, into which no fishing line is inserted;

a rod pipe which is substantially tapered towards the front end thereof, and provided in front of the rod body in such a manner that the rod pipe is shifted towards the reel mounting seat, the rod pipe having a fishing-line lead-in guide at the rear end through which a fishing line is inserted into the rod pipe, the rod body being a hollow pipe which is substantially constant in diameter or is tapered towards the front end thereof, the inside diameter of the rear end portion of the rod pipe being larger than the inside diameter of the front end portion of the rod body, the rod body and the rod pipe provided as one unit except the junction of the rod body and the rod pipe being lower in flexural rigidity towards the front end of the fishing rod.

In the fishing rod thus constructed, the rod body is a hollow pipe, and therefore the fishing rod is light. The rear end portion of the rod pipe, which is gradually tapered towards its front end, is larger in inside diameter than the front end portion of the rod body which is substantially constant in diameter or gradually tapered towards its front end. This feature decreases the resistance which is applied to the fishing line when the latter passes through the rod pipe. Fundamentally, the fishing rod is smaller in flexural rigidity towards its front end. Therefore, the fact that the rod pipe is larger in inside diameter than the rod body does not adversely affect the condition of the fishing rod. That is, the fishing rod is improved in line throwing performance.

In the fishing rod, it is preferable that the rod body is made of a material which essentially contains fibers high in elasticity, and the rod pipe is made of a material which essentially contains fibers low in elasticity. The reinforced fibers different in elasticity are used to realize the gradient in flexural rigidity of the fishing rod.

The invention provides an inter-line fishing rod, which comprises:

a handle having a reel mounting seat, and grips;

a rod body connected to the front end portion of the handle, into which no fishing line is inserted;

a rod pipe provided in front of the rod body in such a manner that the rod pipe is shifted towards the reel mounting seat, the rod pipe having a fishing-line lead-in guide at the rear end through which a fishing line is inserted into the rod pipe, the fishing-line lead-in guide being located in the middle of three equal parts into which the whole length of the fishing rod measured in the direction of the central axis of the rod body is divided, fishing-line guides being coaxially fitted in the rod pipe in such a manner as to be radially inwardly protruded.

The fishing rod thus constructed is based on the fact that, when the length of the fishing rod is divided into three equal parts, in the part covering the rod body the fishing rod is not flexible being high in rigidity, whereas in the part covering the rod pipe it is flexible being low in rigidity. Hence, in the fishing rod, the fishing line, when extended from the fishing reel, is laid outside until it reaches the fishing-line lead-in guide located in the middle of the three equal parts, so that the resistance applied to the fishing line is reduced as much as possible. On the other hand, if the fishing line is unable to follow the flexible bending of the fishing rod in the line throwing operation, then it is impossible to throw the line far; that is, the fishing rod is not acceptable in line throwing performance. Hence, when extended over the fishing-line lead-in guide, the fishing line is inserted into the rod pipe so that it follows the flexible bending of the rod pipe. Thus, the resistance applied to the fishing line is decreased greatly, while the fishing line is allowed to follow the flexible bending of the fishing rod. In order to pass the fishing line through the rod pipe in the above-described manner, the fishing line guides are coaxially fitted in the rod pipe in such a manner that they are radially inwardly protrude. This feature prevents the fishing line from contacting water droplets in the rod pipe; that is, the resistance applied to the fishing line is decreased as much. Thus, the resultant fishing rod is much improved in line throwing performance.

In the fishing rod, it is preferable that the fishing-line guides and the fishing-line lead-in guide are insertable into or removable from the rod pipe through the rear end thereof. Since the fishing-line guides and the fishing-line lead-in guide are insertable into or removable from the rod pipe through the rear end thereof, the fishing rod can be readily cleaned and its parts can be replaced with ease. That is, the inside of the rod pipe can be maintained so clean that the resistance applied to the fishing line is decreased, and the fishing rod is improved in line throwing performance as much.

DETAILED DESCRIPTION OF THE PREFERRED EMBODIMENTS

The invention will be described with reference to its embodiments shown in the accompanying drawings in more detail.

Figure 1:
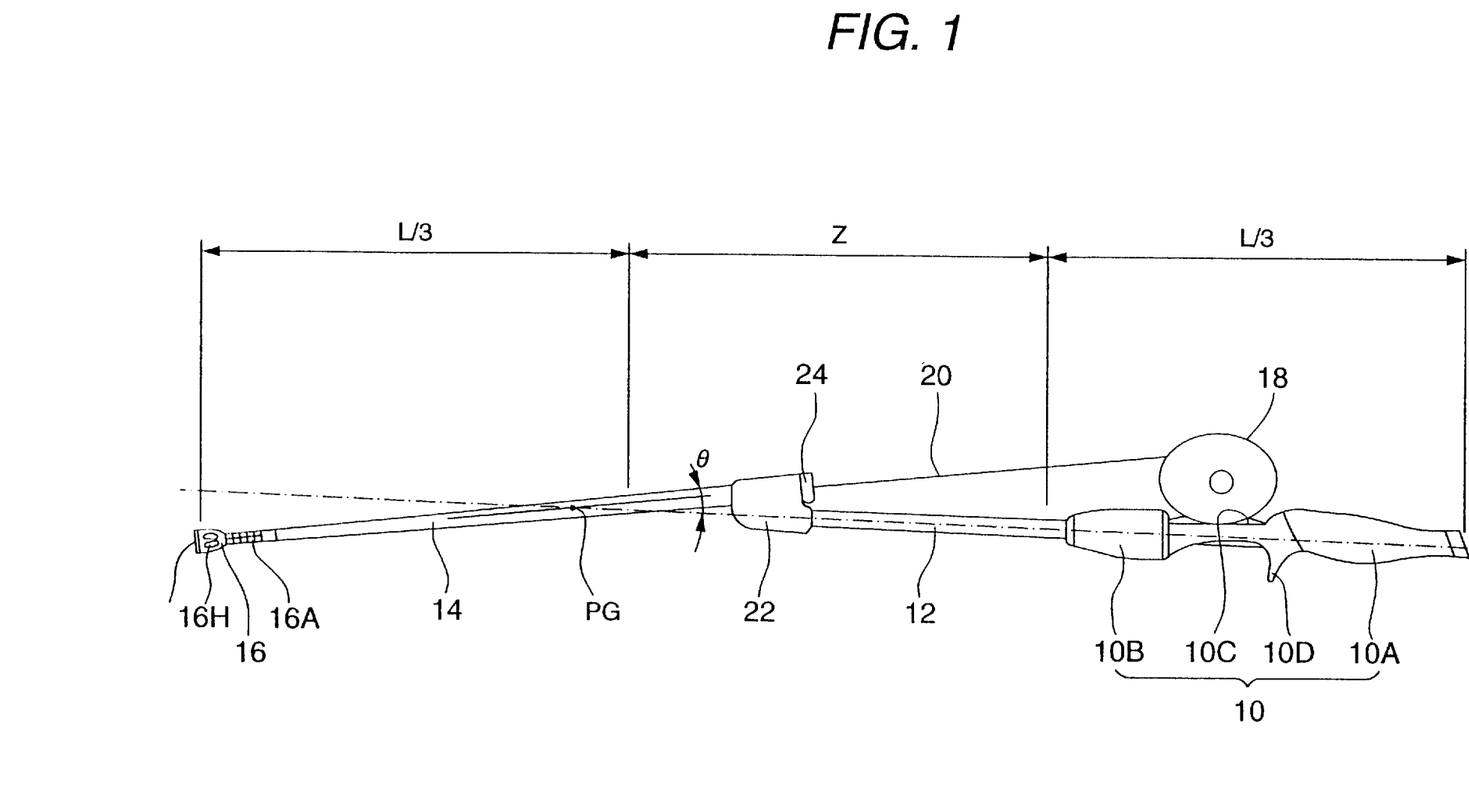
FIG. 1 is a side view showing an inter-line fishing rod according to the invention.

FIG. 1 is a side view of an inter-line type lure fishing rod according to the invention. The fishing rod comprises a handle 10, a rod body 12, and a rod pipe 14. The handle 10 is made up of a rear grip 10A, a front grip 10B, and a reel mounting seat 10C between those grips 10A and 10B, on which a double-bearing type fishing reel 18 is fixedly mounted. A trigger 10D is provided on the side of the handle which is opposite from the side where the reel mounting seat 10C is provided. The trigger 10D is used as follows: In operating the handle with the hand holding the rear grip 10A, the finger is placed on the trigger 10D.

The rod body 12 is slightly tapered towards the front end, and is coupled to the front end of the handle 10. More specifically, the rear end portion of the rod body 12 is fixedly inserted deep into the handle 10 in such a manner that the rod body 12 is coaxial with the handle 10. The front end portion of the rod body 12 is connected through a supporting member 22 to the rod pipe 14 which is in the form of a thin pipe, in such a manner that the rod pipe 14 is inclined downwardly towards the one side of the handle which is opposite from the other side where the reel mounting seat 10C is provided, and the axis of the rod pipe 14 forms an angle θ with respect to the axis of the rod body 12. The angle θ is about 15° or less.

The rod pipe 14 has a fishing-line lead-in guide 24 at the rear end, and a top guide 16 at the front end. Hence, a fishing line 20 pulled out of the double-bearing type fishing reel 18 is extended obliquely downwardly, and substantially straightly inserted through the fishing-line lead-in guide 24 into the rod pipe 14 without passing through the rod body 12, and then led out of the rod pipe 14 through the top guide 16. As is apparent from the above description, in the insertion of the fishing line 20 into the rod pipe 14, the fishing line 20 let out of the fishing reel 18 is maintained substantially unchanged in the direction of extension. Hence, when the fishing rod is swung to throw the terminal hook device, the resistance applied to the fishing line is low, and accordingly the terminal hook device can be thrown far, even accurately to the aimed point.

As was described before, in the case where the whole length of the fishing rod measured in the direction of axis of the rod body 12 is divided into three equal parts, the fishing-line lead-in guide 24 is located in the middle part Z. And the fishing line is not passed through the rod body 12 so that the resistance applied to the fishing line is reduced as much; that is, the fishing rod is improved in line throwing performance as much. On the other hand, the fishing line 20 is passed through the rod pipe 14. Therefore, when the fishing rod is swung, the fishing line 20 follows the reaction of the fishing rod; that is, the fishing rod is excellent in line throwing performance. It is preferable that the fishing line lead-in guide 24 is located within an area between the position which is about L/2 from the rear end of the fishing rod and the position which is about L/3 from the front end of the fishing rod (where L is the whole length of the fishing rod).

In addition, it is preferable that the gravity center PG of the rod pipe 14 is on or near the prolongation of the central axis of the rod body 12 as shown in FIG. 1. The fishing rod thus designed is free from the difficulty that, when the fishing rod is swung, the torque of the rod body adversely affects the operation of the fishing rod.

Figure 2:
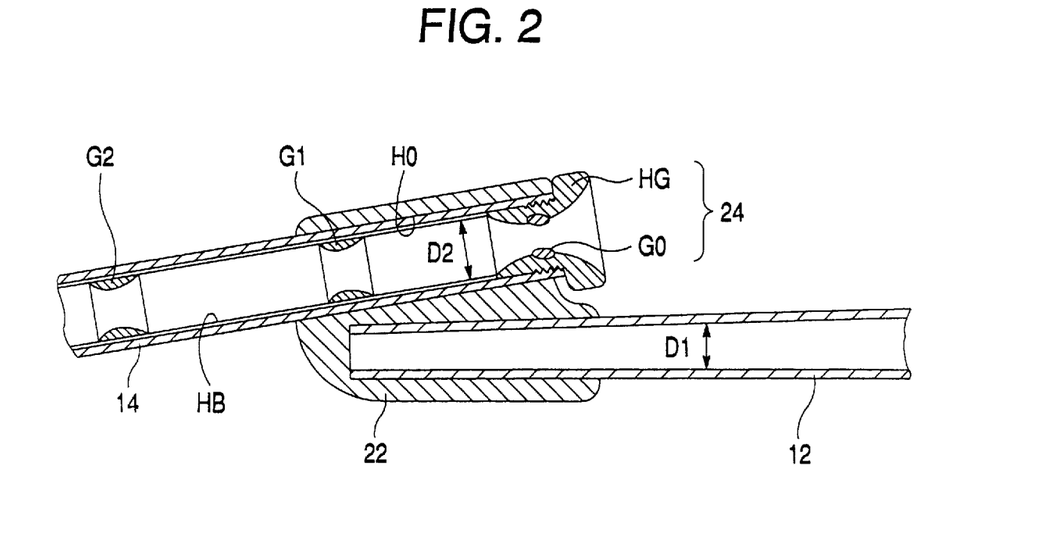
FIG. 2 is an enlarged longitudinal sectional view showing essential parts of the fishing rod illustrated in FIG. 1.

FIG. 2 is an enlarged longitudinal sectional view showing the junction of the rod body 12 and the rod pipe 14. Since the fishing line is not passed through the rod body 12, it is unnecessary to accurately determine the inside diameter of the rod body 12; however, it is preferable that the outside diameter of the rod body 12 is relatively small, to facilitate the operation of the fishing rod. That is, as for the rod body 12, it is essential to determine its rigidity according to conditions required for a fishing rod to be formed. Thus, the rod body 12 is made of a hollow pipe which is small in outside diameter, but larger in wall thickness than the rod pipe 14. Hence, the rod body 12 may be a solid one.

The inside diameter, namely the maximum inside diameter D2 of the rear end portion of the rod pipe 14 is larger than the inside diameter D1 of the front end portion of the rod body 12 immediately behind the fishing-line lead-in guide 24 in the longitudinal direction. For balance in rigidity, the rod pipe 14 is made smaller in wall thickness than the rod body 12. The large inside diameter of the rod pipe 14 is to smoothly pass the fishing line through it. As was described before, the rear end portion of the rod pipe 14 is connected through the supporting member 22 to the front end portion of the rod body 14 in such a manner that the axis of the former 14 forms the aforementioned angle θ with respect to the axis of the latter 12. The supporting member 22 is formed by using, for instance, synthetic resin or fiber-reinforced resin prepreg (FRP), or metal such as titanium which is light in weight, high in mechanical strength, and resistive against sea water. The supporting member 22 is fixedly bonded to the rod body 12, and has a hole HO into which the rod pipe 14 is fixedly inserted. The hole HO is slightly forwardly inclined. The joint structure between the rod pipe 14 and the supporting member 22 is designed similarly as in the case of the joint section of the telescopic type fishing rod, that is, employing a removable engagement between a tapered hole and a tapered outer cylindrical surface. Hence, if the top guide 16 is so designed that it is threadably engaged with the rod pipe 14, then the latter 14 can be removed from the supporting member 22 by pulling it backwardly. The fishing-line lead-in guide, as shown in FIG. 2, comprises a holder HG, and a fishing-line guide ring GO (described later). The holder HG includes a rear annular portion protruded outwardly, which may be so designed as to prevent the rod pipe 14 from coming off accidentally.

The fishing line lead-in guide 24 is connected to the rear end of the rod pipe 14. The fishing-line guide ring GO is made of ceramic, and it is axially held in the holder HG. The outer cylindrical surface of the holder HG is threadably engaged with the inner cylindrical surface of the rod pipe 14. Other fishing line guide rings G1 and G2 are disposed in the part of the rod pipe 14 which is located in front of the fishing line lead-in guide 24 and is other than the front end portion of the rod pipe 14 (between the position which is ½ of the whole length of the rod pipe 14 from the rear end of the latter 14 and the position which is ¾ of the whole length of the same), in such a manner that they are radially inwardly protruded. Hence, even in the case where water drops have been stuck onto the inner cylindrical surface of the rod pipe 14, the fishing line 20 in the latter 14, being guided by those guide rings G1 and G2, scarcely touches the water drops; that is, the resistance applied to the fishing line is reduced as much.

More specifically, those fishing-line guide rings are mounted on a holding member HB which is small in wall thickness, light in weight, and low in flexural rigidity, thus providing an assembly. The assembly thus provided is fixedly fitted in the rod pipe 14. Hence, with the fishing-line lead-in guide 24 removed from the rod pipe, the fishing-line guide rings together with the holding member HB can be pulled out of the rod pipe 14. Hence, for instance the fishing-line guide rings can be readily cleaned; that is, maintenance of the fishing rod can be achieved with ease. The fishing rod may be so designed that the rear end of the holding member HB is locked to the front end of the holder HG, and the holding member HB together with the fishing line guide rings can be pulled out by removal of the fishing line lead-in guide 24.

The inside diameter D2 of the rod pipe 14 is larger than the inside diameter D1 of the rod body 12; however, it should be noted that the rod pipe 14 and the rod body 12 are adjusted in wall thickness so that the former 14 is lower in flexural rigidity than the latter 12. And, the fishing rod except the junction of the rod pipe 14 and the rod body 12 is so adjusted that it is lower in rigidity, or more flexible, towards its front end. The fishing rod, which is lower in rigidity towards the front end, can be obtained by forming the rod body 12 and the rod pipe 14 as follows: That is, the rod body 12 is formed by using reinforced fibers which essentially include fibers high in elasticity (such as carbon fibers of high elasticity, boron fibers, and alumina fibers) with thermo-setting resin or thermo-plastic resin as matrix; and the rod pipe 14 is formed by using reinforced fibers which essentially include fibers low in elasticity (such as carbon fibers of middle or low elasticity, glass fibers, synthetic resin fibers, and aramide fibers) with thermo-setting resin or thermo-plastic resin as matrix.

The elastic moduli of the above-described carbon fibers high, middle and low in elasticity are as listed below:

High elasticity - - - 40000 to 60000 $kgf/mm^2$

Middle elasticity - - - 24000 to 35000 $kgf/mm^2$

Low elasticity - - - 20000 $kgf/mm^2$ or less

For instance, the rod body 12 is formed by using fibers which essentially includes carbon fibers high in elasticity. The rear end portion of the rod pipe 14 which is about ½ to ¾ of the length of the latter 14 is formed by using fibers which essentially includes carbon fibers middle in elasticity, and the remaining portion is formed by using fibers which essentially includes carbon fibers low in elasticity.

Figure 3A:
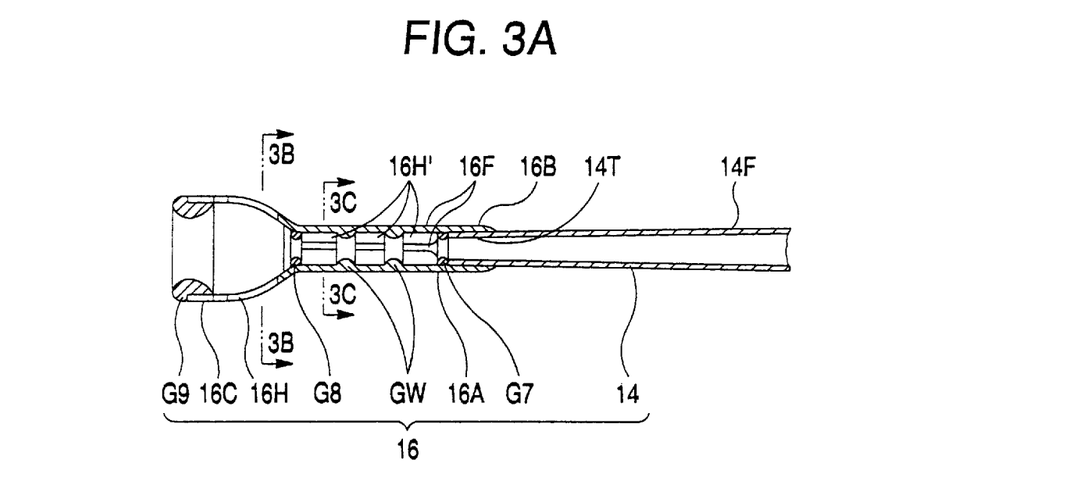
FIG. 3A is also an enlarged longitudinal sectional view showing other essential parts of the fishing rod illustrated in FIG. 1.
Figure 3B:
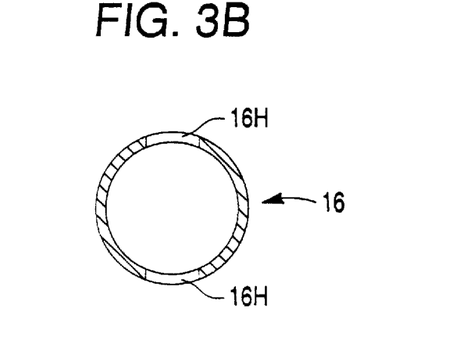
FIG. 3B is a transverse sectional view taken along line 3B—3B of FIG. 3A.
Figure 3C:
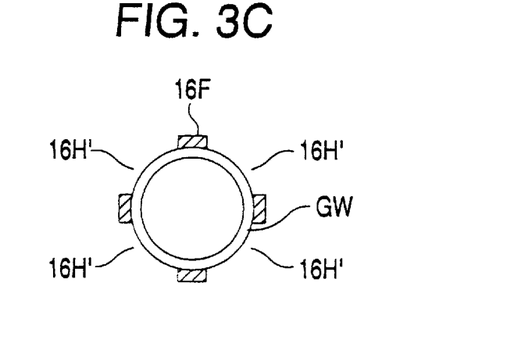
FIG. 3C is a transverse sectional view taken along line 3C—3C of FIG. 3A.

The top guide 16 coupled to the front end portion of the rod pipe 14 is as shown in FIG. 3A. The above-described fishing-line guide rings (G1) are arranged in the rear end portion of the rod pipe 14 which is relatively large in inside diameter; however, it is rather difficult to arrange such fishing-line guide rings in the remaining portion, namely, the front end portion. Hence, the inner cylindrical surface of the front end portion of the rod pipe 14 is finished smooth, preferably mirror-finished, to allow the fishing line to slide on the inner cylindrical surface. Alternatively, a spiral member high in wear resistance may be arranged in the front end portion of the rod pipe 14, or it may be formed integral with it, to provide small protrusions inside the rod pipe. In the case where the inner cylindrical surface of the front end portion of the rod pipe is finished smooth, a synthetic resin of a fluorine group may be applied to the inner cylindrical surface to make the latter water-repellent. Although the rod pipe 14 should be adjusted in flexural rigidity, the front end portion of the rod pipe 14 may be formed by using a titanium or ceramic pipe whose inner cylindrical surface is mirror-finished.

Figure 7:
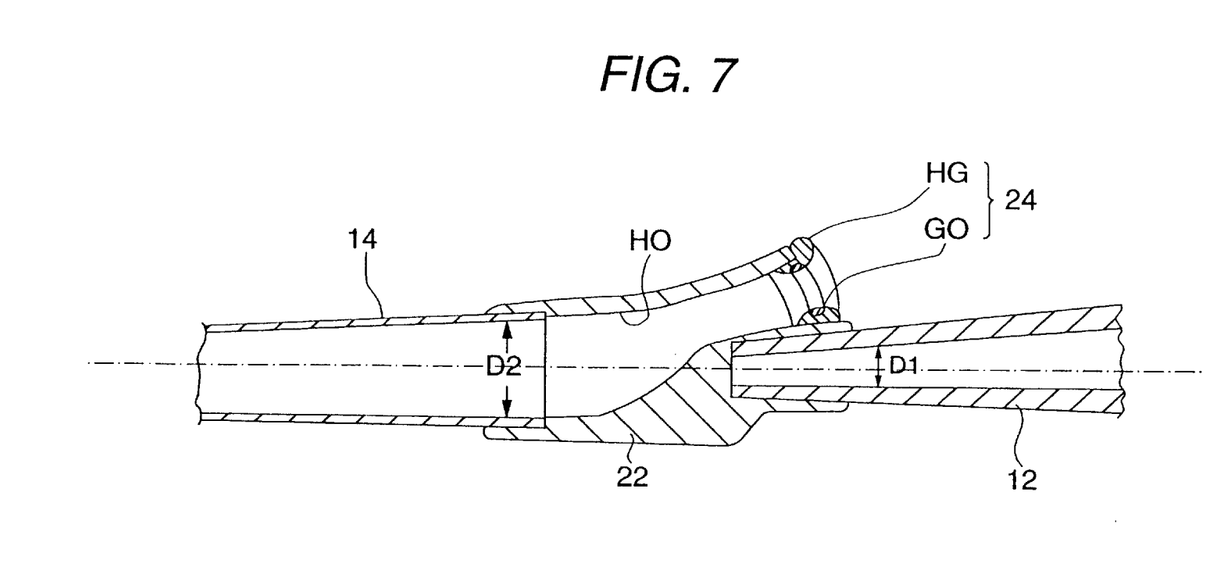
FIG. 7 is an enlarged longitudinal sectional view showing essential parts of another modification of a fishing rod of the invention.

The above-noted arrangement in which the inside diameter D2 of the rod pipe 14 is larger than the inside diameter D1 of the rod pipe 12 is advantageous in order to allow the fishing line to smoothly pass through the inside of the rod pipe 14. Although the rod pipe 14 and the rod body 12 in the embodiment shown in FIG. 2 form an angle θ, they may be arranged concentric to each other as shown in FIG. 7. In this case, the inside diameter D2 of the rear end portion of the rod pipe 14 is set larger than the inside diameter D1 of the front end portion of the rod body 12 in order to allow the fishing line to smoothly pass through the inside of the rod pipe 14. In this modification shown in FIG. 7, the holder HG supporting the fishing-line guide ring GO is fixed by adhesive to a rear end of the hole HO of the supporting member 22, and the rear end portion of the rod pipe 14 is removably fixed to the opposite, front end of the hole HO of the supporting member 22. Thus, the fishing-line is guided from fishing-line guide ring GO to the rod pipe 14 or vice versa through the hole HO of the supporting member 22. In addition, the flexibility of the rod pipe 14 and the rod body 12 are adjusted as desired with the difference in material, wall thickness and the like.

Figure 8:
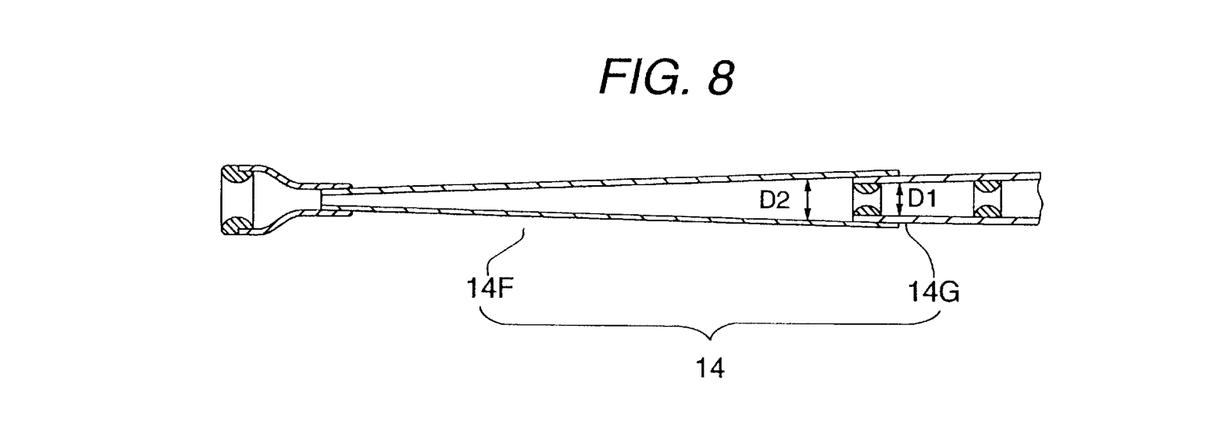
FIG. 8 is an enlarged longitudinal sectional view showing essential parts of another modification of a fishing rod of the invention.

Further, the rod pipe 14 may be divided into a plurality of pipe parts coupled one another so that these pipe parts satisfies the above condition with regard to the inside diameter. That is, the rod pipe 14 may be comprised of such plural pipe parts that the inside diameter D2 of the rear end portion of a pipe part is set larger than the inside diameter of D1 of the front end portion of another pipe part coupled to the former pipe part. FIG. 8 shows an example of such modification in which the rod pipe 14 is divided into two pipe parts, namely a front pipe part 14F and a rear pipe part 14G, and the inside diameter D2 of the rear end portion of the front pipe part 14F is set larger than the inside diameter D1 of the front end portion of the rear pipe part 14G. In this example, the front and rear pipe parts are coupled together such that the inner cylindrical surface of the rear end portion of the front pipe part 14F is tightly fitted on the outer cylindrical surface of the front end portion of the rear pipe part 14G.

In the above-described embodiment shown in FIG. 1, the rod pipe 14 and the rod body 12 are each provided as one tubular member. However, the rod pipe 14 or the rod body 12 may be formed by connecting a plurality of tubular members. In this case, the rod body 12 or the rod pipe 14 can be readily adjusted in length, and the condition of the fishing rod can be more suitably adjusted according to the weight of the terminal hook device such as a lure. On the other hand, regardless of whether the rod pipe 14 is made up of a plurality of tubular members or not, the rod pipe 14 may be connected to the supporting member 22 by using a screw as follows: That is, the screw is driven from outside of the supporting member 22 until its end fixedly pushes the outer cylindrical surface of the rod pipe 14. In this case, the rod pipe 14 can be fixed with the screw after being suitably moved back and forth relative to the rod body 12 to adjust the condition (flexibility) of the fishing rod.

The top guide 16, whose body is made of metal such as stainless steel and titanium or synthetic resin, comprises a body connecting cylinder 16A. That is, the top guide 16 is fixedly connected through the body connecting cylinder 16A to the front end portion of the rod pipe 14. As was described before, the top guide 16 may be threadably engaged with the rod pipe 14. A small fishing-line guide ring G7 is provided between the body mounting cylinder 16A and the end of the rod pipe 14. The fishing-line guide ring G7 may be securely fixed by adhesive to the end of the rod pipe 14 or to the inner surface of the body mounting cylinder 16A. The front end portion of the top guide 16 is formed into a cup-shaped portion which is larger in diameter than the body connecting cylinder 16A. A fishing-line guide ring G8, which is similar to the aforementioned ring G7, is provided along the border between the cup-shaped portion and the body connecting cylinder 16A. A large fishing-line guide ring G9 is engaged with the opening of the cup-shaped portion of the top guide 16.

The above-described lure fishing rod is of inter-line type. Hence, during fishing, the fishing line will never be caught by the fishing-line guide rings. In addition, the top guide 16 is smooth, and its front end portion is formed into the cup-shaped portion larger in diameter. Therefore, the fishing line will never be caught by the top guide 16 during fishing.

The cup-shaped portion of the top guide 16 has draining holes 16H behind the fishing-line guide ring G9. The cup-shaped portion and the body connecting cylinder 16A are connected together through connecting frames 16F which supports annular water-breaking protruded guides GW, so that water-breaking openings 16H' are provided between the cup-shaped portion and the body connecting cylinder at portions other than the annular water-breaking protruded guides GW and connecting frames 16F. Hence, in the case where the fishing line is wound under load as in the case where it catches a fish, water is removed from the fishing line by the large and small fishing-line guide rings and the annular water-breaking protruded guides GW. As a result, during the course in which the fishing line 20 passes through the top guide 16, the water is drained outside through the draining holes 16H and the water-breaking openings 16H'; that is, it scarcely enters the rod pipe 14. Hence, in swinging the fishing rod, the fishing line 20 is prevented from being brought into contact with the water droplets; that is, the resistance applied to it is decreased as much. This means that the fishing rod is improved in line throwing performance.

Figure 4A:
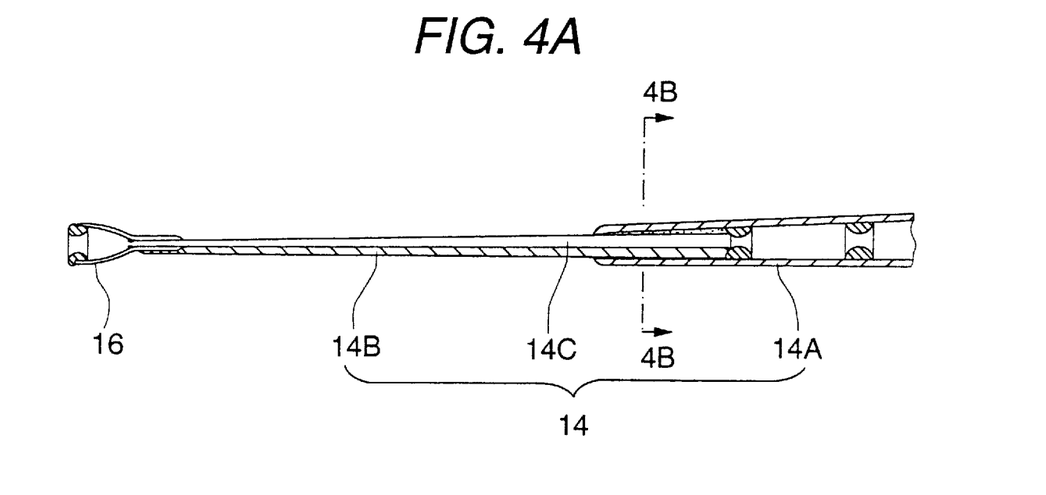
FIG. 4A is a longitudinal sectional view showing another example of a rod pipe shown in FIG. 1.
Figure 4B:
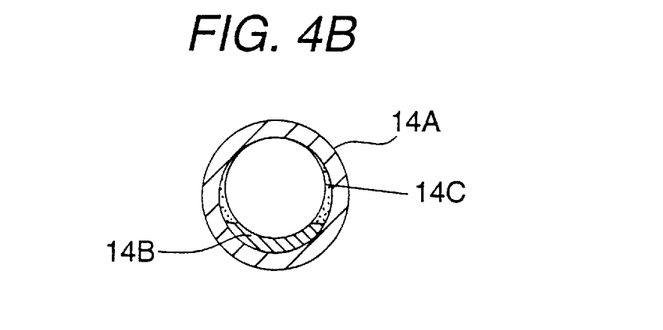
FIG. 4B is a transverse sectional view taken along line 4B—4B of FIG. 4A.

In designing the front end portion of the rod pipe 14, there may arise a possibility that making the front end portion of the rod pip 14 low in flexural rigidity to follow delicate operation becomes inconsistent with adopting a structure which allows the fishing line 20 to smoothly pass through the front end portion to reduce the resistance applied to the fishing line 20. That is, setting the front end portion of the rod pipe 14 to have an inside diameter meeting the requirement of reduction of resistance inevitably increases the outside diameter of the front end portion of the rod pipe 14, which may obstruct the provision of the aimed delicate flexibility. In order to overcome this difficulty, the rod pipe 14 may be modified as shown in FIGS. 4A and 4B. That is, the front end portion of the rod pipe 14 is replaced with a solid rod 14B. The solid rod 14B has a wide and shallow groove in its one side (in the upper side in FIG. 4), and a guide pipe 14C made of a material much lower in elasticity than that of the solid rod 14B is laid in the groove of the solid rod 14B. The top guide 16 is connected to the front ends of the guide pipe 14C and the solid rod 14B so that the fishing line passing through the top guide 16 is led into the inside of the guide pipe 14C.

In other words, the rod pipe 14 is made up of the solid rod 14B, the guide pipe 14C, and the remaining, namely, a rod pipe base 14A. The solid rod 14B and the guide pipe 14C are fixedly connected to the inner surface of the rod pipe base 14A with adhesive. Concrete examples of the guide pipe 14C are water-repellent silicon pipes or "Teflon" pipes, acrylic resin pipes whose inner surfaces are made rough so as to be hydrophilic to improve slippage of the fishing line, and rubber or elastomer resin pipes whose inner surfaces are made hydrophilic with several fishing-line guide rings fitted therein.

Figure 9:
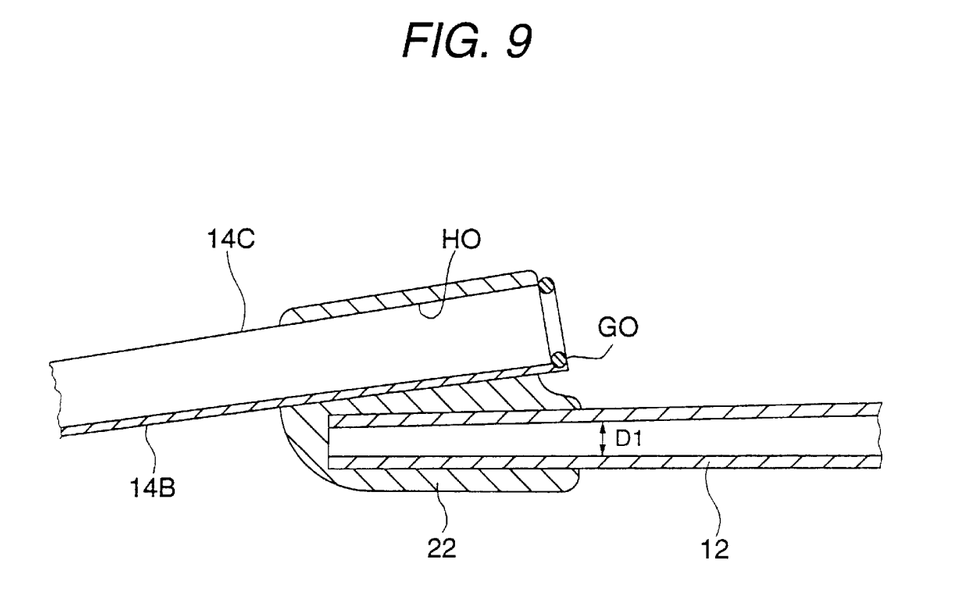
FIG. 9 is an enlarged longitudinal sectional view showing essential parts of another modification of a fishing rod of the invention.

The structure made up of the combination of the solid rod 14B and the guide pipe 14C is useful in many ways, particularly in a case that the flexural rigidity of a tubular rod part is lowered while a sufficiently large inside diameter is secured for the tubular rod part. If required, the rod pipe 14 as a whole may be constructed by the combination of the solid rod 14B and the guide pipe 14C as shown in FIG. 9. In this modification shown in FIG. 9, the solid rod 14B and the guide pipe 14C are fixed, preferably by adhesive, to the hole HO of the supporting member 22, and the fishing-line guide ring GO is directly fixed, preferably by adhesive, to both a radially inner surface of the solid rod 14B and an axial terminus of the guide pipe 14C.

Figure 10:
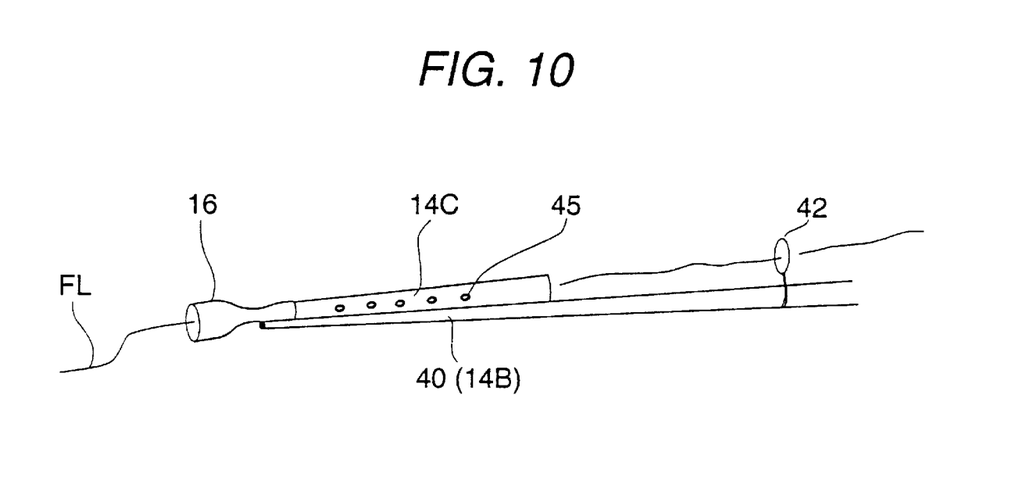
FIG. 10 is an enlarged side view showing essential parts of another modification of a fishing rod of the invention.

Further, the combination of the solid rod 14B and the guide pipe 14C may be employed for an outer-line type fishing rod in which a fishing-line is laid outside the rod pipes by use of a plurality eyelets. FIG. 10 shows an example of such modification, in which the fishing line FL is guided by a plurality of eyelets (only one eyelet 42 is shown), the guide pipe 14C and the top guide 16 and laid outside the fishing rod 40. In this case, a front portion of the rod 40, onto which the guide pipe 14C is provided, can be considered as the solid rod 14B of the invention. In addition, as shown in FIG. 10, the guide pipe 14C may be formed with one or more water drain holes 45.

Furthermore, the combination of the solid rod 14B and the guide pipe 14C may be used as one of rod pipes which are all aligned in a common line coaxial with respect to the handle 10.

Figure 6:
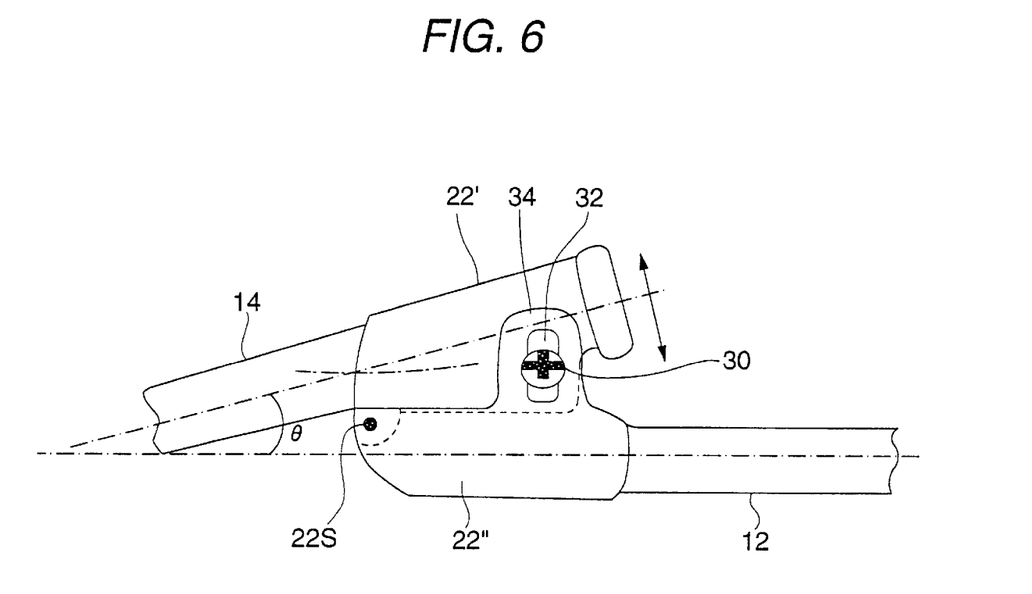
FIG. 6 is an enlarged longitudinal sectional view showing essential parts of a modification of a fishing rod of the invention.

In the above-described embodiment, as shown in FIG. 2, the rod body 12 is coupled through the supporting member 22 to the rode pipe 14 in such a manner that the former 12 forms the predetermined angle with the latter 14. However, as shown in FIG. 6, it may be modified as follows: That is, the supporting member 22 is divided into a first part 22" and a second part 22'. The first part 22" is connected to the rod body 12, while the second part 22' is connected to the rod pipe 14. And the first and second parts are fixedly engaged with each other, so that the angle θ between the rod body 12 and the rod pipe 14 can be adjusted. In this modification shown in FIG. 6, the first and the second parts 22" and 22' are pivotably coupled together by a support shaft 22S, and they are fixed together with a screw 30 inserted through an elongated hole 32 formed in a support frame 34 of the first parts 22", so that the rod pipe 14 is fixed at an desired angle with respect to the rod body 12. This modification is advantageous in the following point: For the above-described embodiment, there are available a variety of double-bearing type reels (18) different in size. In addition, spinning reels or single-bearing type reels different in size are available. When those fishing reels different in size are employed, the fishing lines pulled out of them form somewhat different angles. However, the above-described modification is able to cope with the difference in size of those fishing reels. That is, the modification can eliminate the difficulty that the fishing line 20 is passed through the rod pipe 14 with its direction changed at the fishing-line lead-in guide 24. Hence, the resistance applied to the fishing line is decreased as much. This means that the fishing rod is improved in line throwing performance.

In addition, the fishing rod may be formed as follows: The rod body 12, the rod pipe 14, and the supporting member 22 are provided as one-piece bent pipe by using two core bars and FRP (fiber-reinforced resin prepreg). Alternatively, a tape of FRP (including thermo-setting resin, and thermo-plastic resin) is wound on a flexible core bar made of a material of a rubber group, and is then subjected to molding with an external mold. Furthermore, the fishing rod may be formed without use of the flexible core bar. In this case, an external mold is used with application of an internal pressure. Moreover, it may be formed by injection-molding a material mixed with a reinforcing material. In the case where thermo-plastic resin is used, it should be molded with an external mold. The fishing rod thus provided, being one-piece structure, is high in mechanical strength, and is stable in throwing the fishing line.

Figure 5:
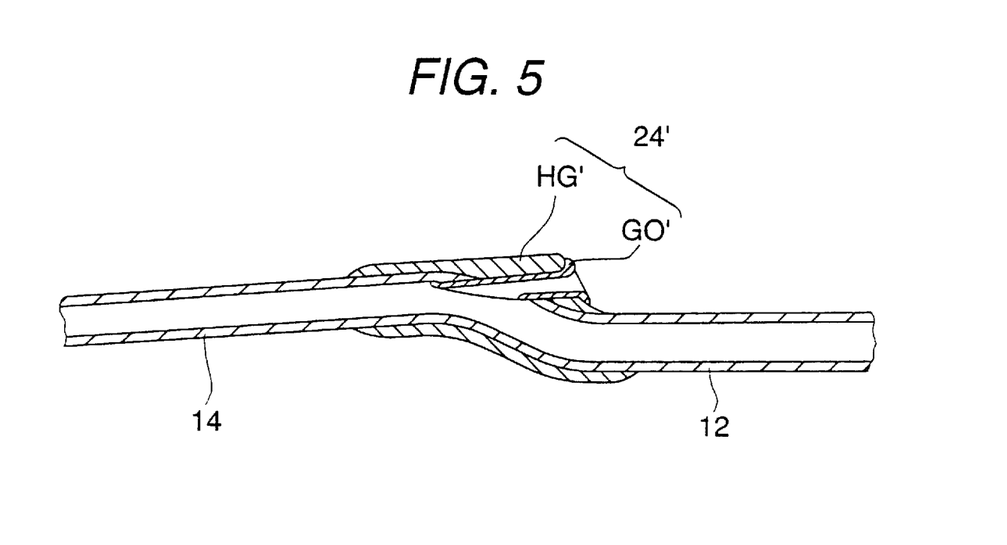
FIG. 5 is a longitudinal sectional view, corresponding to FIG. 2, showing essential parts of another example of the fishing rod according to the invention.

Essential parts of the fishing rod thus formed as one-piece structure are shown in FIG. 5 in section. The rod body 12 and the rod pipe 14 are provided as one-piece. The bent portion of the fishing rod (or the joint of the rod body 12 and the rod pipe 14) is covered with a reinforcing layer HG' which is formed simultaneously when the rod body 12 and the rod pipe 14 are formed. A fishing-line lead-in hole is formed in the fishing rod thus formed, and a fishing-line guide ring G0' of ceramic or the like is fitted in the fishing-line lead-in hole thus formed. Hence, the reinforcing layer HG' serves as a holder for the fishing-line guide ring G0'. That is, in the fishing rod, its fishing-line lead-in guide 24' is made up of the fishing-line guide ring G0' and the holder HG'.

In general, it is rather troublesome to carry a fishing rod which cannot be divided into plural parts. Hence, as was described before, the rod body 12 and the rod pipe 14 may be each divided into jointable parts, or the structure of the supporting member 22 may be so modified to be of telescopic joint type so that, when it is required to put away the fishing rod, the rod pipe is removed backwardly to decrease the length of the fishing rod.

For the same purpose, the above-described embodiment, in which the rod pipe 14 is joined through the supporting member 22 with the rod body 12, may be so modified that, at the supporting member 22, the rod pipe 14 is folded over the rod body 12.

In the above-described fishing rod, the rod pipe 14 is inclined with respect to the rod body 12. However, in the case, too, where the rod pipe 14 is shifted towards the reel connecting seat 10C (i.e. upwardly) with respect to the rod body 12, and the central axes of the rod pipe 14 and the rod body 12 are substantially in parallel with each other, the fishing line pulled out of the fishing reel set off the surface of the rod body 12 is substantially straightly passed through the rod pipe 14. If, in this case, the inside diameter D2 of the rear end portion of the rod pipe 14 is larger than the inside diameter D1 of the front end portion of the rod body 12 which is substantially constant in diameter or tapered towards the front end, then the resistance applied to the fishing line is decreased as much. In addition, if the fishing rod except the junction of the rod pipe 14 and the rod body 12 is lower in flexural rigidity towards its front end, then the condition of the fishing rod is substantially maintained unchanged. That is, the fishing rod is good in condition, and low in line resistance, and it is improved in line throwing performance.

The above-described flexural rigidity of the fishing rod can be obtained readily by forming the rod body 12 with a material which essentially contains fibers high in elasticity, and by forming the rod pipe 14 with a material which essentially contains fibers low in elasticity.

As was described above, in the fishing rod in which, with respect to the rod body 12, the rod pipe 14 is shifted towards the reel connecting seat 10C, and the central axes of the rod pipe 14 and the rod body 12 are substantially in parallel with each other, the fishing line pulled out of the fishing reel set off the surface of the rod body 12 is substantially straightly passed through the rod pipe 14. Hence, the fishing rod is substantially free from the difficulty that the fishing line is resisted when it is changed in the direction of extension. If, in the fishing rod, similarly as in the case of the above-described embodiment, the fishing-line lead-in guide 24 is provided in the middle of the three equal parts into which the length of the fishing rod is divided, and the fishing-line guide rings are fitted in the rod pipe 14 in such a manner that they are radially inwardly protruded, then the fishing line is passed through the rod pipe whose length is minimum and necessary to allow the fishing line to follow the flexible bending of the fishing rod when swung to throw the line. Hence, the fishing line follows the flexible bending of the fishing rod, and it is prevented from contacting water droplets in the rod pipe, and the resistance is decreased which is applied to the fishing line when the latter passes through the rod pipe. If summarized, the resistance applied to the fishing line is decreased, and the fishing line is able to follow the flexible bending of the fishing rod; that is, the fishing rod is improved in line throwing characteristic.

In addition, the fishing rod may be so modified that the fishing-line lead-in guide and the fishing-line guide rings are detachably engaged with the respective parts of the fishing rod, to facilitate the maintenance of the fishing rod and to decrease the resistance applied to the fishing line.

In each of the above-described two structures, similarly as in the case of the above-described embodiment, the top guide may be employed, modification may be so made that, at the junction of the rod pipe and the rod body, the former can be folded over the latter, or the rod pipe and the rod body are each divided into a plurality of parts, and any kind of fishing reel may be mounted on it.

While the invention has been described with reference to the lure fishing rod, the technical concept of the invention may be applied to a general inter-line fishing rod. Accordingly, the fishing reel may be, for instance, a spinning reel, as was described before.

As was described above, in the fishing rod of the invention, the fishing line is less resisted, and therefore the terminal hook device can be accurately thrown far. That is, the inter-line fishing rod of the invention is excellent in line throwing performance. The invention provides fine effects especially when applied to a lure fishing rod or a fly fishing rods whose terminal hook device is light in weight.

What is claimed is:

1. An inter-line fishing rod having a front and rear portion, said inter-line fishing rod comprising:

a handle having a front and a rear end portion, said handle including a reel mounting seat on one side thereof, and at least one grip;

a rod body connected to the front end portion of said handle;

a rod pipe provided in front of said rod body in such a manner that said rod pipe is inclined with respect to said rod body, such that, as said rod pipe extends toward said front portion of said inter-line fishing rod, said rod pipe also extends from said one side of said handle towards an opposite side of said handle from said one side which said reel mounting seat is provided, said rod pipe having a fishing-line lead-in guide through which a fishing line is inserted into said rod pipe and is coupled to said rod body in such a manner that a center of gravity of said rod pipe is substantially aligned with a prolongation of a central axis of said rod body.

2. A fishing rod as claimed in claim 1, wherein said rod pipe is coupled to said rod body in such a manner that the center of gravity of said rod pipe is on or near the prolongation of the central axis of said rod body.

3. An inter-line fishing rod having a front and rear portion, said inter-line fishing rod comprising:

a handle having a front and a rear end portion, said handle including a mounting seat on one side thereof, and at least one grip;

a rod body connected to the front end portion of said handle;

a rod pipe provided in front of said rod body in such a manner that said rod pipe is inclined with respect to said rod body, wherein as said rod pipe extends toward said front portion of said inter-line fishing rod said rod pipe also extends towards an opposite side of said handle from said one side which said reel mounting seat is provided, said rod pipe having a fishing-line lead-in guide through which a fishing line is inserted into said rod pipe; and an angle adjusting mechanism for varying an angle of said rod pipe with respect to said rod body.

4. A fishing rod as claimed in claim 1, wherein said fishing-line lead-in guide is located in the middle of three equal parts into which the whole length of said fishing rod measured along the central axis of said rod body is divided.

5. A fishing rod as claimed in claim 1, wherein said rod pipe and said rod body are provided as a one-piece member.

6. An inter-line fishing rod having a front and rear portion, said inter-line fishing rod comprising:

a handle having a front and a rear end portion, said handle including a mounting seat on one side thereof, and at least one grip;

a rod body connected to the front end portion of said handle;

a rod pipe provided in front of said rod body in such a manner that said rod pipe is inclined with respect to said rod body such that as said rod pipe extends toward said front portion of said inter-line fishing rod said rod ppipe also extends towards an opposite side of said handle from said one side which said reel mounting seat is provided, said rod pipe having a fishing-line lead-in guide through which a fishing line is inserted into said rod pipe, wherein;

said rod body is a hollow pipe which is formed from one of a substantially constant diameter pipe and a pipe tapered towards a front end, while said rod pipe is substantially tapered towards a forwardmost portion thereof, and an inside diameter of a rearmost portion of said rod pipe is larger than an inside diameter of a front end of said rod body, said rod body and said rod pipe being lower in flexural rigidity towards the front portion of said inter-line fishing rod.

7. A fishing rod as claimed in claim 6, wherein said rod body is made of a material which essentially contains fibers high in elasticity, and said rod pipe is made of a material which essentially contains fibers low in elasticity.

8. An inter-line fishing rod having a front and rear portion, said inter-line fishing rod: comprising:

a handle having a mounting seat, and at least one grip;

a rod body connected to a front end portion of said handle;

a rod pipe which is substantially tapered in diameter along a longitudinal direction, and provided in front of said rod body in such a manner that said rod pipe is shifted towards said reel mounting seat, said rod pipe having a fishing-line lead-in guide through which a fishing line is inserted into said rod pipe, said rod body being a hollow pipe which is formed from one of a substantially constant diameter pipe and a pipe tapered towards a front end thereof, an inside diameter of a rearmost portion of said rod pipe being larger than an inside diameter of a front end of said rod body, said rod body and said pipe being lower in flexural rigidity towards the front portion of said fishing rod.

9. A fishing rod as claimed in claim 8, in which said rod body is made of a material which essentially contains fibers high in elasticity, and said rod pipe is made of a material which essentially contains fibers low in elasticity.

10. An inter-line fishing rod having a front and rear portion, said inter-line fishing rod comprising:

a handle having a front and a rear end portion, said handle including a mounting seat on one side thereof, and at least one grip;

a rod body connected to the front end portion of said handle;

a rod pipe provided in front of said rod body in such a manner that said rod pipe is shifted towards said reel mounting seat, said rod pipe having a fishing-line lead-in guide through which a fishing line is inserted into said rod pipe and is coupled to said rod body in such a manner that a center of gravity of said rod pipe is substantially aligned with a prolongation of a central axis of said rod body, said fishing-line lead in guide being located in the middle of three parts into which the whole length of said fishing rod measured in the direction of the central axis of said rod body is divided, and fishing-line guides being coaxially fitted in said rod pipe in such a manner as to be radially inwardly protruded.

11. A fishing rod as claimed in claim 10, in which said fishing-line guides and said fishing-line lead-in guide are insertable into or removable from said rod pipe through the rear end thereof.

12. An interline fishing rod, comprising:

a hollow rod body having a first inside diameter; and a hollow rod pipe connected to said rod body through a supporting member, said rod pipe having a second inside diameter at a portion proximate said rod body and larger than said first inside diameter, wherein:

said supporting member has a fishing-line lead in means for introducing a fishing line into the inside of said hollow rod pipe, and said hollow rod body is made of a material which essentially contains fibers high in elasticity, and said hollow rod pipe is made of a material which essentially contains fibers low in elasticity.

13. A fishing rod as claimed in claim 12, wherein said rod pipe is coaxial with respect to said rod body.

14. A fishing rod as claimed in claim 12, wherein said rod pipe is inclined with respect to said rod body.

15. A fishing rod as claimed in claim 12, wherein said first inside diameter is defined by a portion of said rod body immediately behind said fishing-line lead-in means.

16. An inter-line fishing rod comprising:
   a first hollow rod pipe having a first inside diameter and permitting a fishing line to pass through an inside thereof: and
   a second hollow rod pipe connected to said first hollow rod pipe so as to communicate an inside of said second rod pipe with the inside of said first rod pipe to form a path for a fishing line, said second rod pipe having a second inside diameter at a portion immediately in front of said first rod pipe and larger than said first inside diameter; wherein
   said first hollow rod pipe is made of a material which essentially contains fibers high in elasticity, and said second hollow rod pipe is made of a material which essentially contains fibers low in elasticity.

17. A fishing rod as claimed in claim 16, wherein an inner cylindrical surface of said second hollow rod pipe contacts an outer cylindrical surface of said first hollow rod pipe.

18. An inter-line fishing rod having a handle portion and an end portion distal from said handle portion from which a fishing line emerges, said inter-line fishing rod comprising:
   a hollow rod pipe having a first end and a tip end, said hollow rod pipe permitting a fishing line to pass through an inside thereof, said tip end positioned adjacent said end portion of said inter-line fishing rod; and
   a top guide mounted on said tip end of said hollow rod pipe for guiding the fishing line into and out of said hollow rod pipe, wherein said top guide includes:
      a cup-shaped portion;
      a connecting portion connected to said tip end of said hollow rod pipe; and
      a frame connecting said cup-shaped portion to said connecting portion, said frame including at least one water breaking opening located axially between said cup-shaped portion and said connecting portion.

19. A fishing rod as claimed in claim 18, wherein said frame supports a water-breaking guide protruded inwardly from said frame.

20. A fishing rod comprising:
   a rod pipe base having an inner surface;
   a guide pipe permitting a fishing-line to pass through an inside thereof; and
   a solid rod juxtaposed and fixed to said guide pipe so as to reinforce said guide pipe; wherein,
   said guide pipe is fixed to an upper surface of said solid rod such that said solid rod extends substantially throughout the length of said guide pipe, said solid rod and said guide pipe are fixedly adhered to said inner surface of said rod pipe base.

21. A fishing rod as claimed in claim 20, wherein a shallow and wide groove is formed on an upper surface of said solid rod, and said guide pipe is received by said groove.

22. An inter-line fishing rod having a front and rear portion, said inter-line fishing rod comprising:
   a handle having a front and a rear end portion, said handle including a mounting seat on one side thereof, and at least one grip;
   a rod body connected to the front end portion of said handle;
   a rod pipe provided in front of said rod body in such a manner that said rod pipe is inclined with respect to said rod body, wherein as said rod pipe extends toward said front portion of said inter-line fishing rod said rod pipe also extends towards an opposite side of said handle from said one side which said reel mounting seat is provided, said rod pipe having a fishing-line lead-in guide through which a fishing line is inserted into said rod pipe; and
   an angle adjusting mechanism for varying an angle of said rod pipe with respect to said rod body, wherein said angle adjusting mechanism further comprises:
      a supporting member, said support member comprising:
         a first part rigidly attached to said rod body:
         a second part rigidly attached to said rod pipe; and
         a support shaft pivotally mounted to each of said first and second parts to allow said rod pipe and said rod body to pivot with respect to one another.

23. An inter-line fishing rod according to claim 22, wherein said first hollow rod pipe and said second hollow rod pipe are coaxial.

* * * * *